US011149692B2

(12) United States Patent
Venzon et al.

(10) Patent No.: US 11,149,692 B2
(45) Date of Patent: Oct. 19, 2021

(54) DEFLECTION MITIGATION STRUCTURE FOR COMBUSTION SYSTEM

(71) Applicant: General Electric Company, Schenectady, NY (US)

(72) Inventors: Anthony Joseph Venzon, Middletown, OH (US); Jeremy Kevin Payne, Cincinnati, OH (US); Narendra Kumar Patel, Saraipali (IN)

(73) Assignee: General Electric Company, Schenectady, NY (US)

( * ) Notice: Subject to any disclaimer, the term of this patent is extended or adjusted under 35 U.S.C. 154(b) by 398 days.

(21) Appl. No.: 16/006,151

(22) Filed: Jun. 12, 2018

(65) Prior Publication Data

US 2019/0376471 A1 Dec. 12, 2019

(51) Int. Cl.
*F02C 7/20* (2006.01)
*F02K 9/64* (2006.01)
*F23R 3/00* (2006.01)
*F23R 3/50* (2006.01)

(52) U.S. Cl.
CPC .............. *F02K 9/64* (2013.01); *F02C 7/20* (2013.01); *F23R 3/002* (2013.01); *F23R 3/50* (2013.01); *F05B 2280/30* (2013.01)

(58) Field of Classification Search
CPC .. F23R 3/002; F23R 3/007; F23R 3/04; F23R 3/06; F23R 3/16; F23R 3/50; F23R 2900/00005; F23R 2900/00018–03043; F05D 2230/30–314; F05D 2230/90; F02C 7/20
See application file for complete search history.

(56) References Cited

U.S. PATENT DOCUMENTS

| 5,211,536 A | 5/1993 | Ackerman et al. |
| 6,047,539 A | 4/2000 | Farmer |
| 6,235,370 B1 | 5/2001 | Merrill et al. |
| 6,511,762 B1 * | 1/2003 | Lee .................... B32B 18/00 428/697 |
| 7,186,070 B2 | 3/2007 | Morris et al. |
| 7,210,900 B2 | 5/2007 | Urso et al. |

(Continued)

FOREIGN PATENT DOCUMENTS

| CN | 101660768 | 3/2010 |
| CN | 103774134 | 5/2014 |
| CN | 103968420 | 8/2014 |

OTHER PUBLICATIONS

China National Intellectual Property Administration, "First Office Action" issued in connection with application No. 201910507709.3 dated Jun. 17, 2020, 17 pages.

(Continued)

*Primary Examiner* — Arun Goyal
(74) *Attorney, Agent, or Firm* — Hanley, Flight and Zimmerman, LLC

(57) ABSTRACT

A combustion section for a gas turbine engine including an inner casing comprising a first material defining an inner diameter of a pressure vessel and a first heat transfer coefficient. A second material is extended at least partially over an outer diameter of the first material. The second material is disposed radially between the first material and a combustor liner. The second material defines a second heat transfer coefficient less than the first heat transfer coefficient.

20 Claims, 5 Drawing Sheets

(56) References Cited

U.S. PATENT DOCUMENTS

| | | | |
|---|---|---|---|
| 8,388,307 B2 | 3/2013 | Smoke et al. | |
| 8,397,511 B2 * | 3/2013 | Chen | F01D 9/023 60/752 |
| 9,243,508 B2 | 1/2016 | Morgan et al. | |
| 10,150,707 B2 * | 12/2018 | Torigoe | C23C 28/3455 |
| 2010/0227146 A1 * | 9/2010 | Larose | C23C 4/11 428/220 |
| 2016/0146465 A1 | 5/2016 | Cunha et al. | |
| 2016/0370008 A1 * | 12/2016 | Drake | F02C 3/04 |
| 2017/0234226 A1 * | 8/2017 | Jones | F23R 3/02 60/757 |
| 2020/0271017 A1 * | 8/2020 | Okabe | F23R 3/002 |

OTHER PUBLICATIONS

Chinese Patent Office, "Second Office Action," issued in connection with application No. 2019105077093, dated Mar. 10, 2021, 9 pages.

* cited by examiner

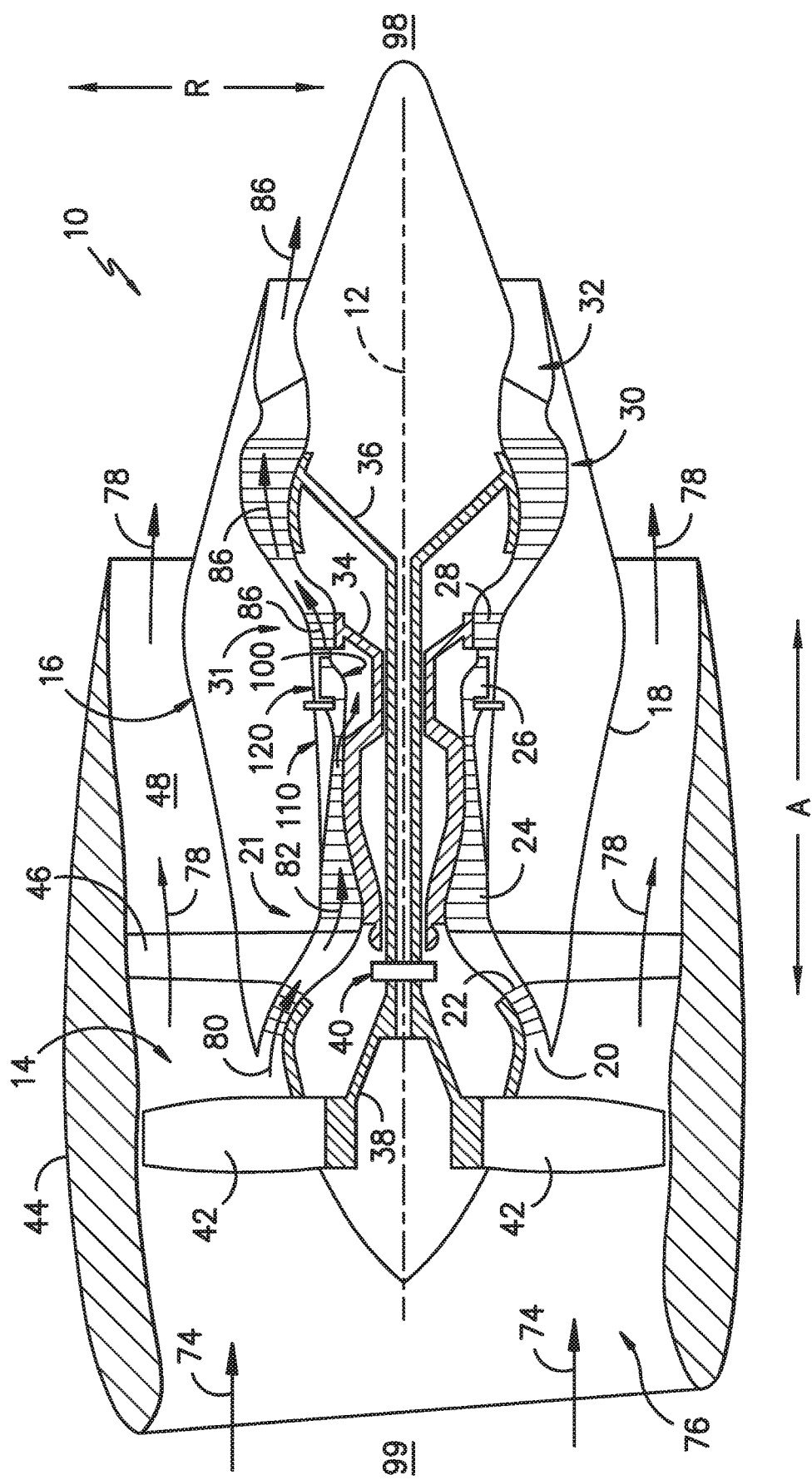
FIG. -1-

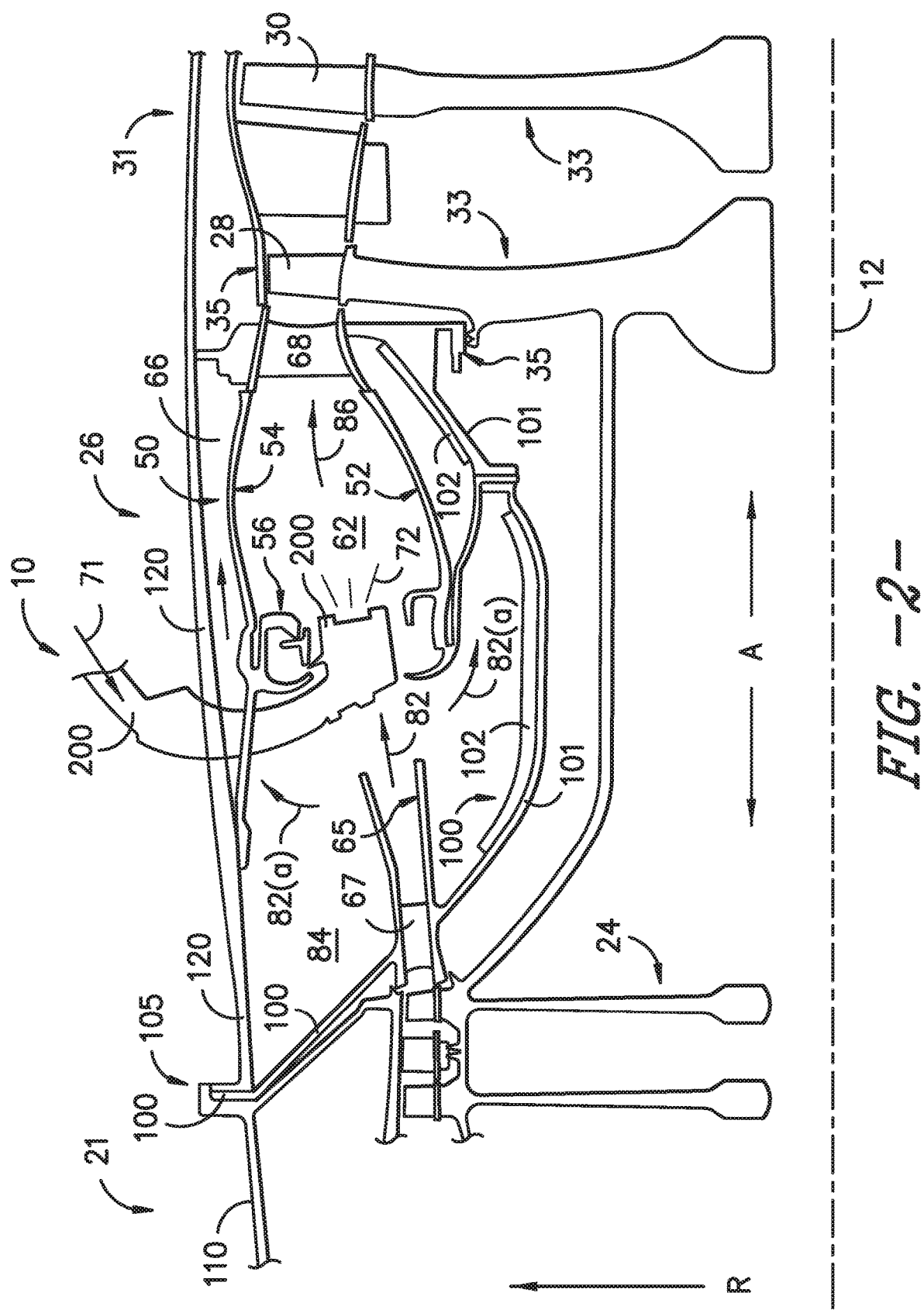
FIG. -2-

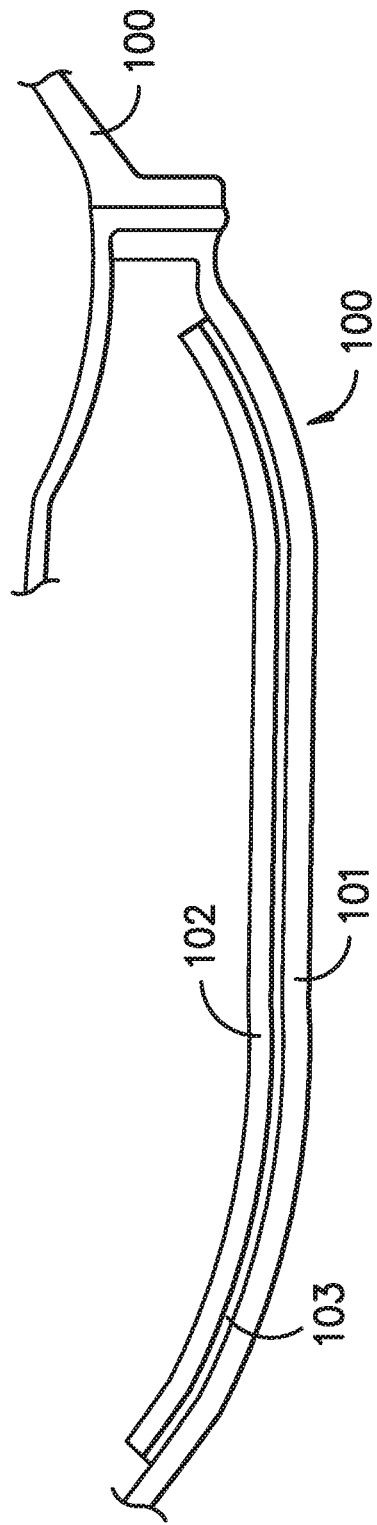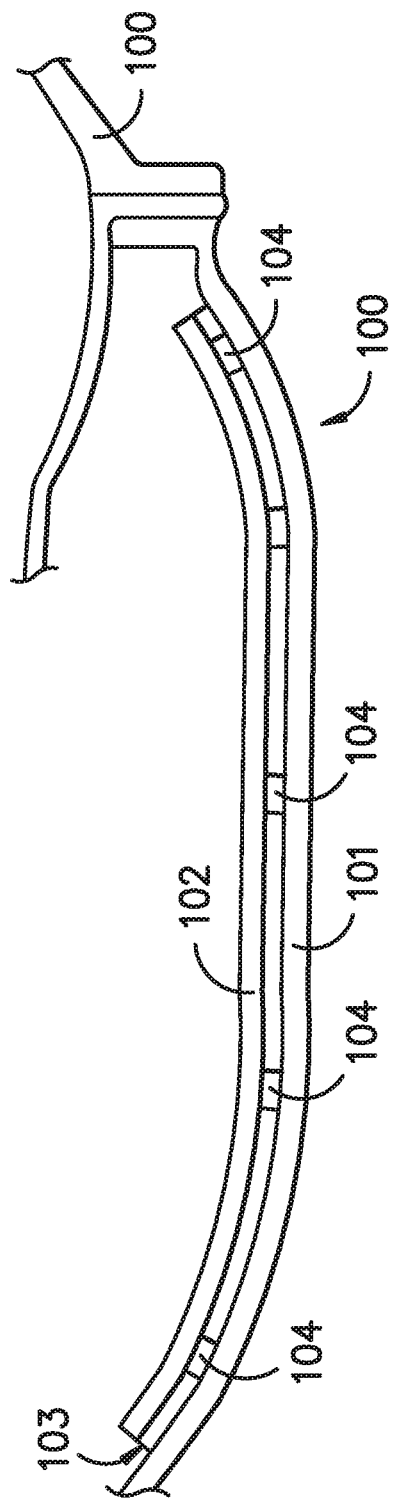

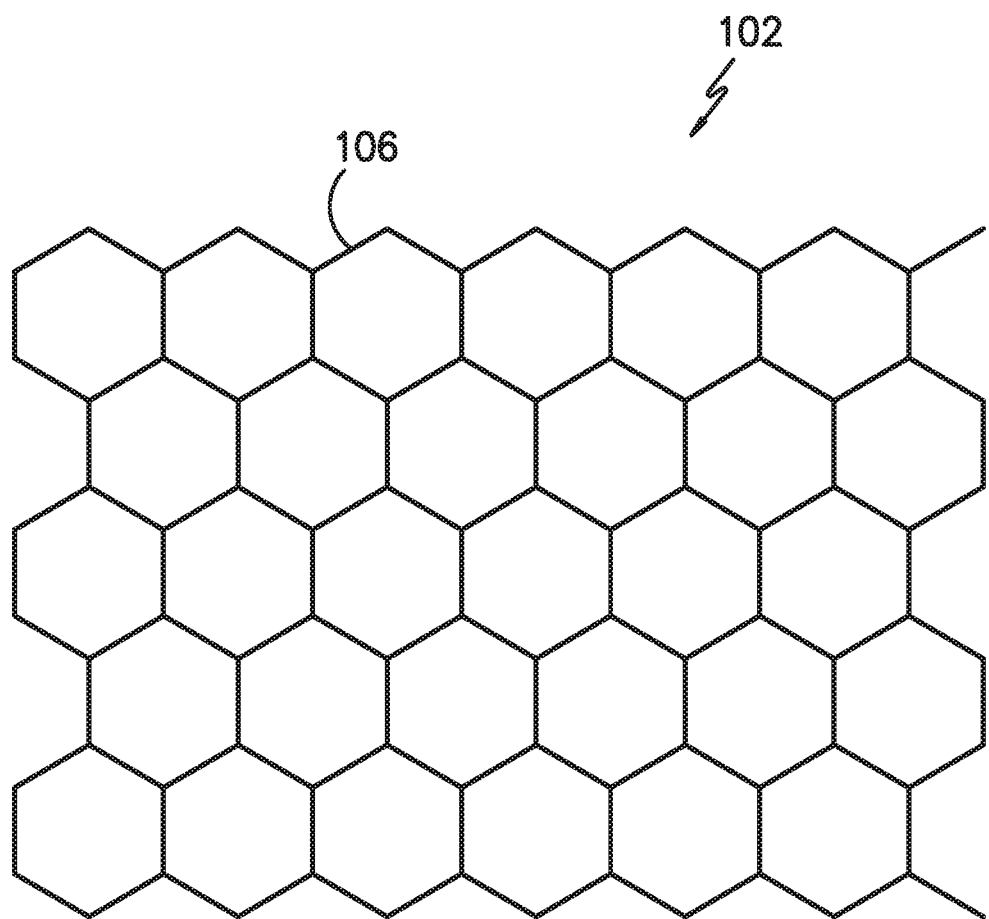
FIG. -5-

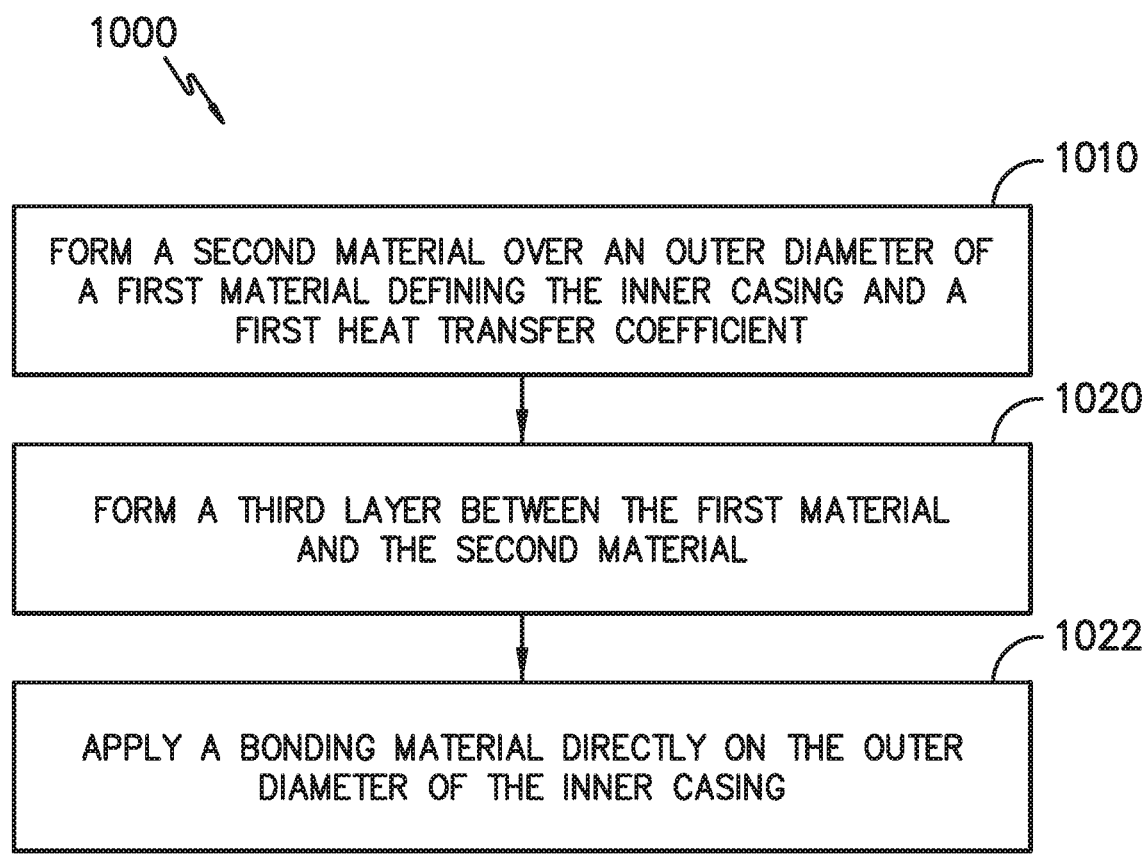
FIG. -6-

DEFLECTION MITIGATION STRUCTURE FOR COMBUSTION SYSTEM

FIELD

The present subject matter relates generally to structures for mitigating deflection or displacement of a hot section casing relative to a surrounding casing.

BACKGROUND

Gas turbine engines include hot sections generally defined by portions of the engine at and downstream of a combustion section. Typical combustion sections incorporate one or more fuel nozzles coupled to an outer casing whose function is to introduce liquid or gaseous fuel into an air flow stream so that it can atomize and burn. General gas turbine engine combustion design criteria include optimizing the mixture and combustion of a fuel and air to produce high-energy combustion while minimizing emissions such as carbon monoxide, carbon dioxide, nitrous oxides, and unburned hydrocarbons, as well as minimizing combustion tones due, in part, to pressure oscillations during combustion.

However, as an engine operates and generates increased heat, thermal gradients between the hot section and an upstream cold section, or between radially outer casings and inner casing, cause deflections relative to one another. Such deflections alter clearances or axial overlaps between rotary and static components in the hot section. Such deflections may alternatively, or additionally, adversely affect fuel nozzle immersions. Such altered immersions may result in combustion section auto-ignition or otherwise adversely affect emissions, performance, or operability of the combustion section and engine.

As such, there is a need for structures and methods that may reduce thermal gradients in the hot section that may mitigate deflections between casings or between casings and rotating structures.

BRIEF DESCRIPTION

Aspects and advantages of the invention will be set forth in part in the following description, or may be obvious from the description, or may be learned through practice of the invention.

An aspect of the present disclosure is directed to a combustion section for a gas turbine engine including an inner casing comprising a first material defining an inner diameter of a pressure vessel and a first heat transfer coefficient. A second material is extended at least partially over an outer diameter of the first material. The second material is disposed radially between the first material and a combustor liner. The second material defines a second heat transfer coefficient less than the first heat transfer coefficient.

In various embodiments, the second material defines a thermal barrier coating. In one embodiment, the second material defines a yttria-stabilized zirconia thermal barrier coating.

In one embodiment, the second material defines a nickel-based alloy.

In another embodiment, the second material defines a honeycomb structure.

In various embodiments, a third layer is defined between the first material and the second material. In one embodiment, the third layer defines a bonding material directly on the outer diameter of the inner casing. In another embodiment, the third layer comprises Ni and Al. In still another embodiment, the third layer comprises NiCRAlY. In still yet another embodiment, the third layer defines a gas cavity between the first material and the second material.

In one embodiment, the first material is a metal or metal alloy.

In another embodiment, the second material is directly on the outer diameter of the inner casing.

Another aspect of the present disclosure is directed to a method for reducing a thermal gradient between an inner casing of a combustion section and a surrounding outer casing. The method includes forming a second material over an outer diameter of a first material defining the inner casing and a first heat transfer coefficient.

In one embodiment of the method, the second material defines a thermal barrier coating. In another embodiment, the second material defines a honeycomb structure.

In various embodiments, the method further includes forming a third layer between the first material and the second material. The third layer contacts the outer diameter of the first material. In one embodiment, forming the third layer further includes applying a bonding material directly on the outer diameter of the inner casing. In one embodiment, the third layer applied directly to the outer diameter of the inner casing comprises Ni and Al. In another embodiment, the third layer is applied directly to the outer diameter of the inner casing defining the first material as a metal or metal alloy. In still another embodiment, the third layer defines a gas cavity between the first material and the second material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross sectional view of an exemplary gas turbine engine incorporating an exemplary embodiment of a combustion section according to an aspect of the present disclosure;

FIG. 2 is an axial cross sectional view of an exemplary embodiment of a combustor assembly of the exemplary engine shown in FIG. 1;

FIGS. 3-4 are cross sectional views of exemplary embodiments of the combustor assembly generally provided in FIG. 2

FIG. 5 is an exemplary embodiment of a portion of the inner casing of the combustion section generally provided in regard to FIGS. 1-4; and FIG. 6 is a flowchart outlining exemplary steps of a method for reducing a thermal gradient between an inner casing of a combustion section and a surrounding outer casing.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of structures and methods for reducing a thermal gradient in the hot section to reduce or mitigate deflections between two or more casings coupled to a fuel nozzle, turbine nozzle, or turbine shroud or seal. The structures and methods shown and described herein include reducing a thermal gradient at an inner casing, such as from one or more of the outer casings to a radially inward portion of the inner case, or between the inner casing and one or more outer casings. Reduction in thermal energy at the inner casing reduces a thermal gradient between a radially inward portion of the inner casing (e.g., inward of the combustor liner) relative to portions axially between a flange at which the inner casing and one or more outer casings is coupled. By reducing the thermal gradient at the inner casing, or between the inner casing and one or more of the outer casings, the structures and methods generally provided herein reduce or eliminate deflections that alter clearances or axial overlaps between rotary and static components in the hot section, such as between the inner casing and the turbine nozzle or shrouds and seals surrounding rotary components of the turbine section.

Still further, the structures and methods shown and described herein may alternatively, or additionally, reduce deflections that adversely affect fuel nozzle immersions. As such, reducing or eliminating changes in fuel nozzle immersions may mitigate combustion section auto-ignition and/or improve emissions, performance, or operability of the combustion section and engine, or mitigate deterioration in emissions, performance, or operability of the combustion section and engine.

Referring now to the drawings, FIG. 1 is a schematic partially cross-sectioned side view of an exemplary high by-pass turbofan jet engine 10 herein referred to as "engine 10" as may incorporate various embodiments of the present disclosure. Although further described below with reference to a turbofan engine, the present disclosure is also applicable to turbomachinery in general, including turbojet, turboprop and turboshaft gas turbine engines, including marine and industrial turbine engines and auxiliary power units. As shown in FIG. 1, the engine 10 has a longitudinal or axial centerline axis 12 that extends there through for reference purposes. A reference axial direction A co-directional to the axial centerline axis 12 is provided. A reference radial direction R extended from the axial centerline axis 12 is also provided. The engine 10 further defines a reference upstream end 99 and a downstream end 98 generally indicating an axial direction of flow through the engine 10.

In general, the engine 10 may include a fan assembly 14 and a core engine 16 disposed downstream from the fan assembly 14. The core engine 16 may generally include a substantially tubular outer core casing 18 that defines an annular inlet 20. The outer core casing 18 encases or at least partially forms, in serial flow relationship, a compressor section 21 having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. The outer core casing 18 may generally include a first outer casing 110 and a second outer casing 120, such as further described below in regard to FIGS. 2-5. The outer core casing 18 further defines an inlet opening 20 through which a flow of air 80 enters the core engine 16.

A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

FIG. 2 is a cross sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54 and a bulkhead 56 that extends radially between upstream ends of the inner liner 52 and the outer liner 54 respectfully. In other embodiments of the combustion section 26, the combustor assembly 50 may be a can or can-annular type. As shown in FIG. 2, the inner liner 52 is radially spaced from the outer liner 54 with respect to axial centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a second outer casing 120. An outer flow passage 66 may be defined around the inner liner 52 and/or the outer liner 54. The inner liner 52 and the outer liner 54 may extend from the bulkhead 56 towards a turbine nozzle or inlet 68 to the HP turbine 28 (FIG. 1), thus at least partially defining a hot gas path between the combustor assembly 50 and the HP turbine 28. A fuel nozzle 200 may extend at least partially through the bulkhead 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel nozzle 200. The compressed air 82 pressurizes the diffuser cavity 84. The compressed air 82 enters the fuel nozzle 200 to mix with a fuel 71. The fuel nozzle 200 mixes fuel 71 and air 82 to produce a fuel-air mixture 72 exiting the fuel nozzle 200. After premixing the fuel 71 and air 82 at the fuel nozzle 200, the fuel-air mixture 72 burns in the combustion chamber 62 to generate combustion gases 86 to drive rotation of the rotors at the turbine section 31.

Typically, the LP and HP compressors 22, 24 provide more compressed air to the diffuser cavity 84 than is needed for combustion. Therefore, a second portion of the compressed air 82 as indicated schematically by arrows 82(a) may be used for various purposes other than combustion. For example, as shown in FIG. 2, compressed air 82(a) may be routed into the outer flow passage 66 to provide cooling to the inner liner 52 and outer liner 54. In addition or in the alternative, at least a portion of compressed air 82(a) may be routed out of the diffuser cavity 84. For example, a portion of compressed air 82(a) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

In regard to FIGS. 3-4, exemplary embodiments of the combustion section 26 are generally provided. Referring now to FIGS. 2-4, the combustion section 26 includes an inner casing 100. The inner casing 100 is extended from a flange 105 at which a first outer casing 110 and a second outer casing 120 are together coupled. The first outer casing 110 is extended forward or upstream from the flange 105. The second outer casing 120 is extended aft or downstream from the flange 105. The inner casing 100 may generally be defined at the flange 105 between the first and second outer casings 110, 120.

In various embodiments, the first outer casing 110 and the second outer casing 120 are each disposed around at least a portion of the core engine 16. In one embodiment, the first outer casing 110 may define an outer casing of the compressor section 21. For example, the first outer casing 110 may generally contain, house, or otherwise attach one or more stator or vane assemblies, frames, or other static structures at the compressor section 21. The first outer casing 110 may further contain a rotating section, such as one or more rotating compressor stages, there within.

The second outer casing 120 may define an outer casing of a hot section, such as the combustion section 26 and/or the turbine section 31. In various embodiments, the second outer casing 120 may generally define a pressure vessel or diffuser casing. For example, the pressure vessel or diffuser casing may define the diffuser cavity 84, the prediffuser 65, and/or the CEGV 67. In still various embodiments, the pressure vessel or diffuser casing may further be defined in conjunction with the inner casing 100. For example, the inner casing 100 may define an inner diameter of the pressure vessel or diffuser casing and the second outer casing 120 may define, at least in part, an outer diameter of the pressure vessel or diffuser casing.

In still various embodiments, the inner casing 100 may further be coupled to the turbine nozzle or inlet 68. The turbine nozzle or inlet 68 may generally define a static structure. The turbine nozzle 68 may further include one or more static shrouds 35 or seals adjacent to one or more shrouds or seals of a rotary component 33 of the turbine section 31 (e.g., disks, blades, hubs, rotors, etc.).

Referring still to FIGS. 2-4, the inner casing 100 includes a first material 101 defining a first heat transfer coefficient. The inner casing 100 further includes a second material 102 extended at least partially over an outer diameter of the first material 101. The second material 102 is disposed radially between the first material 101 and the combustor inner liner 52, i.e., the second material 102 is more proximate to the inner liner 52 than the first material 101. The second material 102 further defines a second heat transfer coefficient less than the first heat transfer coefficient of the first material 101.

The second material 102 of the inner casing 100 provides thermal protection to the first material 101. For example, the second material 102 protects the first material 101 from thermal radiation. As another example, the thermal radiation may derive from production of combustion gases 86 at the combustor assembly 50. As such, in various embodiments, the second material 102 defines a heat shield or thermal barrier between the combustor assembly 50 and the first material 101 of the inner casing 100.

In various embodiments, the second material 102 of the inner casing 100 defines a thermal barrier coating. In one embodiment, the second material 102 defines a yttria-stabilized zirconia thermal barrier coating. In still another embodiment, the second material 102 is applied to or coupled directly on the outer diameter of the inner casing 100.

Referring briefly to FIG. 3, in various embodiments, a third layer 103 may be defined between the first material 101 and the second material 102. The third layer 103 may define a bonding material directly on the outer diameter at the first material 101 of the inner casing 100. The bonding material may generally define a bonding coat for the second material 102 defining a thermal barrier coating.

In various embodiments, the third layer 103 defines a braze or welding material coupling together the first material 101 and the second material 102. In various embodiments, the third layer 103 comprises Ni and Al. In one embodiment, the third layer 103 comprises NiCRAlY.

In still various embodiments, the third layer 103 defines, at least in part, a gas cavity 104 between the first material 101 and the second material 102. For example, the third layer 103 may comprise a plurality of substrates or materials. The third layer 103 may further define one or more cavities between the plurality of substrates or materials. For example, the third layer 103 may include the braze or welding material and the gas cavity 104 therebetween. Still further, the gas cavity 104 may be defined between the first material 101, the second material 102, and the third layer 103. In various embodiments, the gas cavity 104 may provide thermal attenuation or protection of the first material 101 from thermal transfer or radiation from the second material 102.

In still various embodiments, the first material 101 defines a superalloy. For example, the first material 101 may define a metal or metal alloy. In one embodiment, the second material 102 defines a nickel-based alloy.

Referring now an exemplary embodiment of the inner casing 100, in various embodiments, the second material 102 defines a honeycomb structure 106, such as generally provided in regard to FIG. 5. The honeycomb structure 106 may include a plurality of substantially circular or polygonal patterns. The honeycomb structure 106 may generally provide a heat sink preventing or mitigating transfer of thermal energy to the first material 101. For example, the honeycomb structure 106 may prevent transmission of thermal energy from the combustion chamber 62, or from the combustor inner liner 52, to the first material 101 of the inner casing 100.

As such, the second material 102, such as defining the honeycomb structure 106, may prevent deflections in the inner casing 100 by reducing a thermal gradient (i.e., difference in temperature) between radially outward portion of the inner casing 100 (e.g., at the flange 105 or proximate thereto, radially outward of the combustor liner 52) and radially inward portions of the inner casing 100 (e.g., radially inward of the combustor liner 52 or proximate thereto). Mitigating such deflections may reduce or eliminate movement of the inner casing 100 relative to one or more outer casings 110, 120, the fuel nozzle 200, or the turbine section 31, thereby reducing or eliminating losses in combustion section 26 or engine 10 performance and operability associated thereto.

Referring now to FIG. 6, a flowchart outlining exemplary steps of a method for reducing a thermal gradient between an inner casing of a combustion section and a surrounding outer casing is generally provided (hereinafter, "method 1000"). The method 1000 may be implemented in gas turbine engines such as embodiments shown and described in regard to FIGS. 1-5, including incorporating descriptions or limitations described in regard to FIGS. 1-5 to the steps shown and described in regard to FIG. 6. However, it should further be appreciated that the method 1000 may further be implemented in gas turbine engines not shown herein. Still further, although the method 1000 includes steps shown or described in a certain order, it should be appreciated that steps may be re-arranged, re-ordered, re-sequenced, added, or omitted without deviating from the scope of the present disclosure.

The method 1000 includes at 1010 forming a second material over an outer diameter of a first material defining the inner casing and a first heat transfer coefficient. The second material defines a second heat transfer coefficient less than the first heat transfer coefficient. In various embodiments, the first material defines an inner casing (e.g., inner casing 100) of a pressure vessel, such as a diffuser case of a combustion section. For example, the first material may define a metal or metal alloy, such as a superalloy (e.g., a nickel-based alloy), or another material suitable for hot section casings for a gas turbine engine.

In one embodiment, the method 1000 further includes at 1020 forming a third layer between the first material and the second material. The third layer contacts the outer diameter of the first material. In one embodiment, the method 1000 at 1020 further includes at 1022 applying a bonding material directly on the outer diameter of the inner casing. For example, in various embodiments, the second material defines a thermal barrier coating. In one embodiment, the third layer defines a bond coat material applied directly to the outer diameter of the inner casing (e.g., inner casing 100) to enable adhesion of the second material to the first material. In still various embodiments, the third layer applied directly to the outer diameter of the inner casing comprises Ni and Al, such as a NiCRAlY bonding material.

In another embodiment, the second material defines a honeycomb structure coupled to the first material. The method 1000 at 1022 may include applying a bonding material, such as a braze or welding material, to the first material and the second material. In various embodiments, the third layer defines a gas cavity (e.g., gas cavity 104) between the first material and the second material. The gas cavity may define a third heat transfer coefficient between the first material and the second material. The gas cavity defining the third heat transfer coefficient may inhibit transfer of thermal energy from the second material (e.g., second material 102) to the first material (e.g., first material 101).

The embodiments of the engine 10 and methods 1000 shown and described in regard to FIGS. 1-6 including the second material 102 mitigate transfer of thermal energy to the first material 101. Further embodiments include the second material 102 together with the third layer 103 mitigating transfer of thermal energy to the first material 101. Still further embodiments include the second material 102 together with the third layer 103 defining the gas cavity 104 defining a third heat transfer coefficient together mitigating transfer of thermal energy to the first material 101 defining the inner casing 100.

As such, reduction in thermal energy at the inner casing 100 reduces a thermal gradient between the inner casing 100 and one or more of the outer casings 110, 120. Still further, reduction in thermal energy at the inner casing 100 reduces a thermal gradient between a radially inward portion of the inner casing 100 (e.g., inward of the combustor inner liner 52) relative to portions axially between the flange 105 or proximate thereto. By reducing the thermal gradient at the inner casing 100, or between the inner casing 100 and one or more of the outer casings 110, 120, the structures and methods generally provided herein reduce or eliminate deflections that alter clearances or axial overlaps between rotary and static components in the hot section, such as between the inner casing 100 and the turbine nozzle 68 or shrouds surrounding rotary components 33 of the turbine section 31.

Still further, the structures and methods shown and described herein may alternatively, or additionally, reduce deflections that adversely affect axial immersions of the fuel nozzle 200 into or relative to the combustion chamber 62 or a surrounding swirler or vane structure. As such, reducing or eliminating changes in fuel nozzle 200 immersions (e.g., reducing or eliminating changes along the axial direction A) may mitigate combustion section auto-ignition and/or improve emissions, performance, or operability of the combustion section 26 and engine 10, or mitigate deterioration in emissions, performance, or operability of the combustion section 26 and engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustion section for a gas turbine engine, the combustion section comprising:
   a combustor and a combustor casing, the combustor casing defined by an outer casing radially outward from an inner casing;
   the combustor defined by an inner liner disposed radially inward from the outer casing and an outer liner disposed radially between the outer casing and the inner line; and, an inner casing extending at least partially radially inward from the outer casing such that the combustor is at least partially radially enclosed between the inner casing and the outer casing, the inner casing comprising a first material having a first heat transfer coefficient, wherein a second material is extended at least partially over an outer diameter of the first material such that the second material is disposed radially between the first material and the inner liner, the second material spaced apart from the inner liner, and further wherein the second material defines a second heat transfer coefficient less than the first heat transfer coefficient.

2. The combustion section of claim 1, wherein the second material comprises a thermal barrier coating.

3. The combustion section of claim 2, wherein the second material comprises a yttria-stabilized zirconia thermal barrier coating.

4. The combustion section of claim 1, wherein the second material comprises a nickel-based alloy.

5. The combustion section of claim 1, wherein the second material comprises a honeycomb structure.

6. The combustion section of claim 1, wherein a third layer is defined between the first material and the second material.

7. The combustion section of claim 6, wherein the third layer comprises a bonding material directly on the outer diameter of the inner casing.

8. The combustion section of claim 7, wherein the third layer comprises Ni and Al.

9. The combustion section of claim 8, wherein the third layer comprises NiCRAlY.

10. The combustion section of claim 6, wherein the third layer defines a gas cavity between the first material and the second material.

11. The combustion section of claim 1, wherein the first material is a metal or metal alloy.

12. The combustion section of claim 1, wherein the second material is directly on the outer diameter of the inner casing.

13. A method for reducing a thermal gradient between an inner casing of a combustion section having a combustor and a combustor casing, the combustor casing defined by an outer casing radially outward from the inner casing, the method comprising:
   forming a second material over an outer diameter of a first material defining the inner casing and having a first heat transfer coefficient, wherein the second material defines a second heat transfer coefficient less than the first heat transfer coefficient, wherein the combustor is defined by an inner liner disposed radially inward from the outer casing and an outer liner disposed radially between the outer casing and the inner liner, wherein the inner casing extends at least partially radially inward from the outer casing such that the combustor is at least partially radially enclosed between the inner casing and the outer casing, and wherein the second material is spaced apart from the inner liner.

14. The method of claim 13, wherein the second material comprises a thermal barrier coating.

15. The method of claim 13, wherein the second material comprises a honeycomb structure.

16. The method of claim 13, further comprising:
   forming a third layer between the first material and the second material, wherein the third layer contacts the outer diameter of the first material.

17. The method of claim 16, further comprising:
   applying a bonding material directly on the outer diameter of the inner casing.

18. The method of claim 17, wherein the third layer that is applied directly to the outer diameter of the inner casing comprises Ni and Al.

19. The method of claim 17, wherein the third layer is applied directly to the outer diameter of the inner casing defining the first material as a metal or metal alloy.

20. The method of claim 16, wherein the third layer defines a gas cavity between the first material and the second material.

* * * * *